United States Patent Office 3,409,628
Patented Nov. 5, 1968

3,409,628
5-(3-PYRIDYLETHYL)PYRIDOINDOLE DERIVATIVES
Leo Berger, Montclair, and Alfred John Corraz, Wayne, N.J., assignors to Hoffmann-La Roche Inc., Nutley, N.J., a corporation of New Jersey
No Drawing. Continuation-in-part of application Ser. No. 549,455, May 12, 1966. This application Apr. 5, 1967, Ser. No. 628,530
20 Claims. (Cl. 260—296)

ABSTRACT OF THE DISCLOSURE

Novel 5-(3-pyridylethyl)pyridoindole derivatives having anti-histaminic and anti-allergic properties are prepared by condensing a N-amino-N-arylaminoethylpyridine with a 4-piperidone.

RELATED APPLICATION

This application is a continuation-in-part of application Ser. No. 549,455 filed May 12, 1966, now abandoned.

BRIEF SUMMARY OF THE INVENTION

This invention relates to novel 5-(3-pyridylethyl)pyridoindole derivatives, to processes and intermediates for the preparation thereof and to pharmaceutical compositions containing them. More particularly, the invention relates to novel compounds of the formula

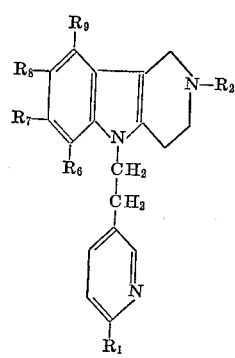

VII wherein $R_1$ is hydrogen or lower alkyl; $R_2$ is hydrogen, lower alkyl or phenyl-lower alkyl; and $R_6$, $R_7$, $R_8$ and $R_9$ are each independently hydrogen, bromo, chloro, methyl or trifluoromethyl such that at least one of $R_6$, $R_7$, $R_8$ or $R_9$ is other than hydrogen, and when $R_2$ is lower alkyl, $R_8$ is hydrogen, chloro, bromo or trifluoromethyl and pharmaceutically acceptable acid addition salts thereof.

DETAILED DESCRIPTION

The novel end products of this invention, i.e., the compounds of Formula VII above are prepared according to the following reaction sequence:

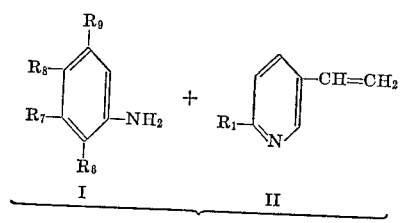

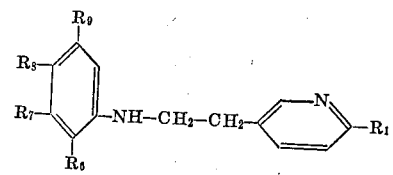

III

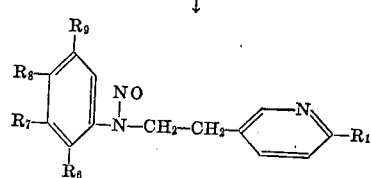

IV

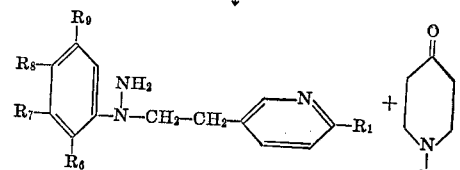

V                                                  VI

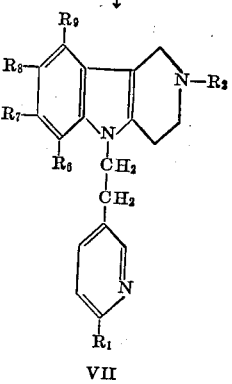

VII wherein $R_1$, $R_2$, $R_6$, $R_7$, $R_8$ and $R_9$ have the same meaning as hereinabove.

In the method of preparation as outlined above, the novel end products of Formula VII are prepared by the condensation of an N-amino-N-arylaminoethylpyridine of Formula V with a piperidone of Formula VI. The condensation is suitably carried out in the presence of an inert organic solvent such as, for example, benzene and the like. The ratio of reactants employed in the condensation is not critical though, for practical purposes, it is preferred to utilize the piperidone in excess. The condensation is suitably carried out at an elevated temperature suitably at a temperature between about room temperature and the boiling point of the reaction mixture though higher or lower temperatures could also be utilized, the preferred temperature range being between about 20° C. and about 150° C.

Compounds of Formula VII wherein $R_8$ is bromine or chlorine or compounds wherein $R_8$ and $R_7$ are each independently selected from the group consisting of bromine, chlorine, methyl and trifluoromethyl, i.e., compounds of the formulas

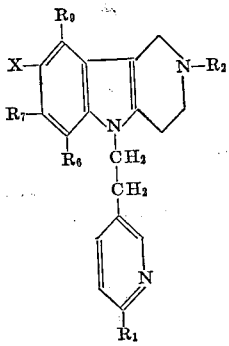

VII-a and

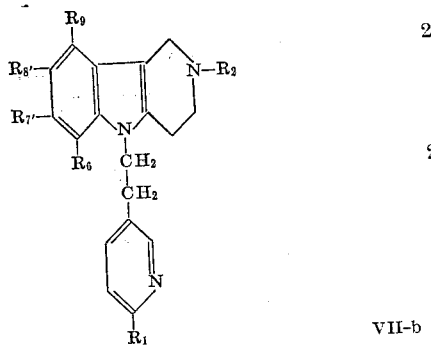

VII-b wherein X is bromine or chlorine; each of $R_8'$ and $R_7'$ is bromine, chlorine, methyl or trifluoromethyl; and $R_1$, $R_2$, $R_6$, $R_7$ and $R_9$ all have the same meaning as hereinabove constitute a preferred group. More particularly, the preferred compounds of this invention are the compounds of Formula VII–a and especially those compounds of Formula VII–a wherein $R_6$, $R_7$ and $R_9$ are each hydrogen, i.e., compounds of the formula

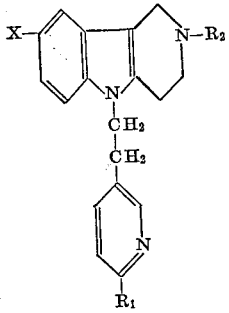

VII-c wherein $R_1$, $R_2$ and X have the same meaning as hereinabove.

The N-amino-N-arylaminoethylpyridine intermediates of Formula V wherein at least one of $R_6$, $R_7$, $R_8$ or $R_9$ is other than hydrogen are also novel compounds and thus constitute a part of this invention. They are prepared by reduction of the corresponding N-nitrosoamine of Formula IV. The reduction can be effected by any of the usual techniques for reducing nitroso compounds to amines preferably by the use of a mild reducing agent such as zinc. The reduction is suitably carried out in the presence of an aqueous acid at a temperature below room temperature, preferably between about 0° and 20°.

The N-nitrosoamines of Formula IV wherein at least one of $R_6$, $R_7$, $R_8$ or $R_9$ is other than hydrogen are also novel compounds which constitute part of this invention. They are prepared by nitration of the corresponding arylaminoethylpyridine derivatives of Formula III. The nitration is suitably effected by treating a compound of Formula III with nitrous acid which can be conveniently prepared in situ from hydrochloric acid and sodium nitrite. The reaction is suitably carried out in the presence of an inert organic solvent such as a lower alkanol and preferably at a low temperature, i.e., a temperature between about 25° and about 0° C.

The intermediates of Formula III wherein at least one of $R_6$, $R_7$, $R_8$ and $R_9$ is other than hydrogen are also novel compounds which constitute a part of this invention. They are prepared by the condensation of an aniline derivative of Formula I and a vinylpyridine of Formula II. The condensation is carried out under anhydrous conditions employing sodium as the condensing agent. The condensation reaction can be carried out in the absence of solvent or if desired there can be used any anhydrous inert organic solvent. The reaction is suitably effected at an elevated temperature, e.g., between about room temperature, i.e., about 20° C. and about 100° C., though higher or lower temperatures can be used.

Suitable acid addition salts of the compounds of Formula VII are prepared from non-toxic organic and inorganic acids. Suitable organic acids are, for example, maleic acid, fumaric acid, ascorbic acid, tartaric acid, salicylic acid, succinic acid, citric acid and the like. Suitable inorganic acids are, for example, the hydrohalic acids, e.g., hydrochloric acid and hydrobromic acid, sulfuric acid, sulfamic acid, phosphoric acid and the like. The acid addition salts are readily obtainable by the usual techniques for the preparation of salts from acids.

As has been stated above, the novel end products of this invention, i.e., the compounds of Formula VII, are useful as anti-histaminic agents and anti-allergic agents. More particularly, they are especially useful because of their strong anti-histaminic activity with little or no sedative or hypnotic effect. In particular, the compound 8-chloro-1,3,4,5 - tetrahydro - 2-methyl-5-[2-(6-methyl-3-pyridyl) ethyl]-2H-pyrido[4,3-b]indole in animal tests has shown strong anti-histaminic properties at an effective dosage level much less than that required for standard reference anti-histamines and is an effective anti-histaminic agent without sedative side effects at a dosage for which marked sedative effects are obtained with previously available anti-histamines. The compounds of this invention particularly 8-chloro-1,3,4,5-tetrahydro-2-methyl-5-[2-(6-methyl-3-pyridyl)ethyl]-2H-pyrido[4,3-b]indole prevent anaphylactic shock.

In their use as anti-histamines, the compounds of this invention as well as their pharmaceutically acceptable acid addition salts are used in dosages ranging from 2 to 50 mg. per day usually orally. In animals such as mice and guinea pigs dosages between .175 and 1.0 mg./kg. substantially inhibit the effects of histamine. Preferably, the compounds of this invention are administered in dosages ranging from 8 to 12 mg. per patient per day usually in small dosages of about 4 mg. at intervals of about an hour or more. More or less frequent and larger or smaller unit dosages are, of course, possible depending upon the needs of the patient and the individual response.

The novel end products of this invention can be formulated into the usual dosage forms for oral or parenteral administration. Thus, this invention also includes within its scope pharmaceutical compositions which comprise one or more of the compounds of Formula VII or a non-toxic acid addition salt thereof together with a pharmaceutical carrier. In clinical practice the compounds of the present invention will normally be administered orally in consequence of which the preferred compositions are those suitable for oral administration.

Solid compositions for oral administration include compressed tablets, pills, dispersible powders and granules. In such solid compositions the active compound is admixed with at least one inert diluent such as calcium carbonate, potato starch, alginic acid or lactose. The compositions may also comprise, as is normal practice, additional substances other than inert diluents, e.g., lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavoring, perfuming and preserving agents.

Compositions according to the invention for oral administration include capsules of adsorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or suspending media are propylene glycol, polyethylene glycol, vegetable oils such as olive oil and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation or by heating. The compositions may also take the form of sterile solids which may be dissolved in sterile water or some other sterile injectable medium immediately before use.

The percentage of active ingredient in the compositions of the invention may be varied, it being necessary that it should constitute a proportion such as a suitable dosage for the therapeutic effect desired in the species of animal shall be obtained. Obviously several unit dosage forms may be administered at about the same time.

In the case of oral administration, the preferred unit dose form of the composition will contain between about 2 and about 12 mg. of active substance (calculated as base).

The nature and objects of this invention can be more fully understood with respect to the following examples which are given merely as further illustration of the invention and are not to be construed as a limitation thereof. All temperatures are stated in degrees centigrade.

EXAMPLE 1

Preparation of 5-(2-p-chlorophenylaminoethyl)-2-methylpyridine

A mixture of 192 g. (1.5 moles) of p-chloroaniline, 178.5 g. (1.5 moles) of 2-methyl-5-vinylpyridine (dried over anhydrous potassium hydroxide) and 4.2 g. (0.18 mole) of sodium was placed in a 2 l. round-bottomed three-necked flask fitted with stirrer, thermometer, reflux condenser and gas inlet fitting. The reaction flask was flushed with dry nitrogen during the addition of the reagents and during the reaction an atmosphere of dry nitrogen was maintained over the reaction mixture. The mixture was heated, with stirring, on a steam bath. After 7 hrs., the reaction mixture was allowed to cool to room temperature and 30 ml. of ethanol was added dropwise with stirring followed by 30 ml. of water. The mixture was steam-distilled for 7 hrs. When the pot residue had cooled to room temperature, it was extracted with ether (3×400 ml.). The ether extract was washed with water until neutral. After the ether solution had dried over anhydrous sodium sulfate (24 hrs.), the desiccant was filtered off. Following removal of the ether, the residue was distilled under reduced pressure and a distillate boiling between 203–206° C. at 0.3 mm. was collected. The distillate was crystallized in the receiver to give the 5-(2-p-chlorophenylaminoethyl) - 2 - methylpyridine product melting at 84–85° (from heptane).

Preparation of 2-methyl-5-(N-nitroso-2-p-chlorophenylaminoethyl)pyridine

To a solution of 1 l. of 1 N hydrochloric acid and 1 l. of ethanol in a 3 l. round-bottomed three-necked flask fittted with stirrer, thermometer and dropping funnel, there was added 220 g. (0.89 mole) of 2-methyl-5-(2-p-chlorophenylaminoethyl) pyridine prepared as above. The mixture was stirred at room temperature until complete solution was obtained (approx. ½ hr.), and then cooled to +5° C. by means of an ice bath. A solution of 72 g. (1.04 moles) of sodium nitrite in 500 ml. of water was added dropwise with stirring while the temperature as maintained near 5° C. with an ice bath. The addition took approximately 3 hrs. Following the addition, the reaction mixture was allowed to warm slowly to room temperature over the course of 3 hrs., and left overnight at room temperature. The mixture was again cooled by means of an ice bath and after 3 hrs. at ice-bath temperature, the mixture was filtered. The filter cake was washed several times with cold water and allowed to air dry on a porous plate for 48 hrs. The 2-methyl-5-(N-nitroso-2-p-chlorophenylaminoethyl)pyridine product obtained melted at 96–97°.

Preparation of 2-methyl-5-(N-amino-2-p-chlorophenylaminoethyl)pyridine

To a stirred solution of 232 g. (0.84 mole) of 2-methyl-5 - (N - nitroso-2-p-chlorophenylaminoethyl)pyridine prepared as above in 1l. of glacial acetic acid and 300 ml. of water in a 3 l. round-bottomed three-necked flask fitted with stirrer, and thermometer, there was added 400 g. of zinc dust over the course of 4 hrs. During the addition of the zinc, the reaction temperature was held between +5° to +10° C. by means of an ice-salt bath. After the addition was completed, the reaction mixture was stirred near +5° C. for an additional 1 hr., after which the reaction temperature was allowed to rise to room temperature over the course of 3 hrs., with constant stirring. The reaction mixture was then stirred for 1 hr. at 35° C., one liter of cold water was added and the mixture was filtered. The filter cake was washed several times with water. The filtrate and the washings were combined and made strongly alkaline (until the ZnO dissolves) with 6 N sodium hydroxide. During the addition of alkali, the temperature was held below 10° C. by the addition of ice. The alkaline mixture was extracted with ether (3 × 800 ml.) and, in turn, the ether extract was washed by extraction with cold water (5 × 200 ml.). When the ether extract had dried over anhydrous sodium sulfate, the desiccant was filtered off. The ether was stripped from the solution on a water bath and the residue was distilled under high vacuum to give 2-methyl-5-(N-amino - 2 - p - chlorophenylaminoethyl)pyridine, boiling point 214–220°/0.9 mm.

Preparation of 8-chloro-1,3,4,5-tetrahydro-2-methyl-5-[2-(6-methyl-3-pyridyl)ethyl]-2H-pyrido[4,3-b]indole A solution of 70 g. (0.278 mole) of 2-methyl-5-(N-amino-2-p-chlorophenylaminoethyl)pyridine, prepared as above, 38 g. (0.336 mole) of 1-methylpiperidone-4 and 350 ml. of benzene in a 1 liter round-bottomed, three-necked flask fitted with stirrer, condenser and Dean-Stark trap and dropping funnel was refluxed for 24 hrs., during which time approximately 4.6 ml. of water was removed from the reaction mixture. The condenser and Dean-Stark trap were removed from the flask and replaced with a vacuum distillation apparatus. After the volatile components had been removed under water pump pressure on a water bath, the distillation apparatus was removed and the condenser again replaced on the flask. To the stirred warm residue there was added in small portions, over 0.25 hr., 280 ml. of 5.3 N hydrochloric acid in alcohol. After the addition was completed, the reaction mixture was refluxed an additional 0.5 hr., allowed to cool to room temperature, and poured onto 500 g. of ice. The mixture was made strongly alkaline with 6 N sodium hydroxide. The base that separated was extracted with ether (4× 400 ml.) and, in turn, the ether extracts were combined and washed by extraction with water (4× 200 ml.). Following drying of the ether solution and removal of the desiccant by filtration, the ether was distilled from the solution on a water bath under reduced pressure. The residue was crystallized from 130 ml. of ethyl acetate to give 62.0 g. of an almost white product; M.P. 113–114°. Following recrystallization of the base from 130 ml. of ethyl acetate, the 8-chloro-1,3,4,5-tetrahydro-2-methyl-5-[2-(6-methyl-3-pyridyl)-ethyl]-2H - pyrido[4,3 - b]indole product having a melting point of 114.5–115.5° was obtained. 55 g. of the pure base was dissolved in 75 ml. of methanol by warming slightly to facilitate solution. A saturated solution of hydrogen chloride in methanol was carefully added until the solution was acid to congo red. After the mixture had remained in an ice bath for several hours, it was filtered and dried for 24 hrs. under high vacuum over $P_2O_5$ to give 8-chloro-1,3,4,5-tetrahydro-2-methyl-5-[2-(6 - methyl-3-pyridyl)-ethyl]-2H-pyrido[4,3-b]indole dihydrochloride, M.P. 260–265°.

50 g. of the dihydrochloride was purified by recrystallization from 1200 cc. of ethanol and 200 cc. of ether. The pure salt was dried in high vacuum over $P_2O_5$ at 60° for 48 hrs. and melted at 264–266°.

EXAMPLE 2

Preparation of 2-benzyl-8-chloro-1,3,4,5-tetrahydro-5-[2-(6-methyl-3-pyridyl)ethyl]-2H-pyrido[4,3-b]indole A solution of 10 g. of 2-methyl-5-(N-amino-2-p-chlorophenylethyl)pyridine, 10 g. of 1-benzylpiperidone-4 and 70 ml. of benzene was refluxed for 24 hrs. During this period, 0.6 ml. of water was removed from the reaction by the use of a Dean-Stark water trap. After the volatile components had been removed under reduced pressure on a water bath, 50 ml. of 5.2 N hydrogen chloride in ethanol was added in small portions to the warm stirred residue. When the addition had been completed, the reaction mixture was refluxed an additional 0.5 hr., allowed to cool to room temperature and poured onto 200 g. of ice. 6 N sodium hydroxide was added until the mixture was strongly alkaline and the liberated base was extracted with ether. In turn, the ether solution was washed by extraction with water. After the ether solution had dried over anhydrous sodium sulfate, the desiccant was filtered from the solution and the ether was removed on a water bath to give 15 g. of a viscous oil. The oil was dissolved in 100 ml. of alcohol and hydrogen chloride in alcohol was added until the solution was acid to congo red. Several volumes of ether were added and the resulting precipitate was filtered. Following two crystallizations from a solution of ethyl acetate and methanol, the 2-benzyl-8-chloro-1,3,4,5-tetrahydro - 5 - [2 - (6 - methyl-3-pyridyl)-ethyl]-2H-pyrido[4,3-b]indole product was obtained; M.P. 236–238°.

EXAMPLE 3

Preparation of 3-(2-p-chlorophenylaminoethyl)pyridine

A stirred mixture of 25.5 g. of p-chloroaniline, 22 g. of 3-vinylpyridine and 0.5 g. of sodium was heated on a steam bath for 7 hrs. The mixture remained overnight at room temperature. Under stirring there were added 20 ml. of ethanol followed by 30 ml. of water. The mixture was steam distilled for 5 hrs. After the pot residue had cooled to room temperature, it was extracted with ether. The ether extract was washed with water until neutral and dried over anhydrous sodium sulfate. When the desiccant had been filtered from the solution, the ether was removed on a water bath. The residue was crystallized from ethyl acetate to give 3-(2-p-chlorophenylaminoethyl)-pyridine, M.P. 86–87°.

Preparation of 3-(N-nitroso-2-p-chlorophenylaminoethyl)pyridine

To a stirred solution of 15 g. of 3-(2-p-chlorophenylaminoethyl)pyridine, prepared as above, in 70 ml. of 1N hydrochloric acid and 70 ml. of ethanol cooled to 10° C., there was added over the course of 2 hrs. a solution of 5 g. of sodium nitrite in 30 ml. of water. The temperature during the addition was held below 10° C. For a period of 3 hrs., the mixture was stirred without cooling and then cooled to 2° C. The mixture was filtered, washed with water and dried over anhydrous sodium sulfate. Following the removal of the desiccant and the ether, 3-(N-nitroso-2 - p - chlorophenylaminoethyl)pyridine, M.P. 87–88° C. was obtained.

Preparation of 3-(N-amino-2-p-chlorophenylaminoethyl) pyridine

To a stirred, cooled solution of 15.7 g. of 3-(N-nitroso-2-p-chlorophenylaminoethyl)pyridine, prepared as above, 60 ml. of glacial acetic acid and 18 ml. of water there was added 20 g. of zinc dust over the course of 2 hrs. During the addition of zinc, the temperature was held below 10° by means of an ice salt bath, and following the addition, the reaction mixture was stirred for 2 hrs. without cooling. The reaction was then stirred an additional hour at 37° C., after which there was added 200 ml. of water. The mixture was filtered and the filter cake was washed several times with water. The filtrate and washings were combined and made strongly alkaline with 6 N sodium hydroxide. During the neutralization, ice was added to moderate the temperature. The alkaline mixture was extracted with ether and the ether solution was extracted until neutral with water. After the ether solution had dried over anhydrous sodium sulfate, the desiccant was filtered off and the ether was distilled from the solution to leave the 3-(N-amino-2-p-chlorophenylaminoethyl)pyridine product.

Preparation of 8-chloro-1,3,4,5-tetrahydro-2-methyl-5-[2-(3-pyridyl)ethyl]-2H-pyrido[4,3b]indole A solution of 13 g. of 3-(N-amino-2-p-chlorophenylaminoethyl)pyridine, prepared as above, 7 g. of 1-methyl-piperidone-4 and 50 ml. of benzene was refluxed for 18 hrs. During this time, 0.7 ml. of water was removed from the reaction with a Dean-Stark trap. After the volatile components had been removed under reduced pressure on a water bath, 50 ml. of 7 N hydrogen chloride in ethanol was added in small portions to the stirred warm residue. After the addition, the reaction was refluxed an additional 0.5 hr. and poured onto ice. The mixture was made alkaline with 6 N sodium hydroxide and the liberated base was extracted with ether. The ether solution was washed by extraction with water and dried over anhydrous sodium sulfate. Following the removal of the desiccant and the ether, the residue was crystallized from ethyl acetate to give the 8 - chloro - 1,3,4,5 - tetrahydro - 2 - methyl - 5-[2 - (3 - pyridyl)ethyl] - 2H - pyrido[4,3b]indole product; M.P. 130–132° C.

7 g. of pure 8 - chloro - 1,3,4,5 - tetrahydro - 2-methyl-5-[2-(3-pyridyl)ethyl]-2H-pyrido[4,3b]indole was dissolved in 20 ml. of ethanol and ethanolic hydrogen chloride was added until the solution was acid to Congo red. Several volumes of ether were added and the precipitate that formed was filtered and dried to give the dihydrochloride salt; M.P. 254–255° C. A small portion was recrystallized from ethyl acetate and methanol; M.P. 255–256° C.

EXAMPLE 4

Preparation of 5-(2-p-bromophenylaminoethyl)-2-methylpyridine

A mixture of 43 g. (0.25 mole) of p-bromoaniline, 30 g. (0.252 mole) of 2-methyl-5-vinylpyridine and 1 g. (0.044 mole) of sodium was heated with stirring on a steam bath. After 7 hrs., the reaction mixture was allowed to cool to room temperature, and 30 ml. of ethanol was added dropwise with stirring followed by 30 ml. of water. The mixture was steam distilled for 5 hrs. After cooling to room temperature, the pot residue was extracted with ether. The ether extracts were combined and washed by extraction with water until neutral. After the ether solution was dried over sodium sulfate, the desiccant was filtered off and the ether removed on a steam bath. Following removal of the ether, the residue was distilled under reduced pressure to give a distillate of B.P. 195–204°/0.6 mm. The distillate crystallized in the receiver, giving as the 5-(2-p-bromophenylaminoethyl)-2-methylpyridine product of melting point 82–83.5° (from ethyl acetate).

Preparation of 2-methyl-5-(N-nitroso-2-p-bromophenyl-aminoethyl)pyridine

A solution of 9 g. (0.13 mole) of sodium nitrite in 50 ml. of water was added dropwise with stirring over the course of 1.5 hrs. to a solution of 32 g. (0.11 mole) of (2-p-bromophenylaminoethyl)-2-methylpyridine, prepared as above, in 120 ml. of 1 N hydrochloric acid and 100 ml. of ethanol. During the addition, the temperature of the reaction was held below 10° by means of an ice bath. After the addition, the temperature was allowed to rise to room temperature with stirring. The reaction was kept at room temperature overnight and was then cooled to 5°. Following filtration and drying, there was obtained 2-methyl-5-(N-nitroso-2-p-bromophenylaminoethyl)pyridine, M.P. 89–91°.

Preparation of 5-(N-amino-2-p-bromophenylaminoethyl)-2-methylpyridine

To a stirred solution of 42 g. of 2-methyl-(N-nitroso-2-p-bromophenylaminoethyl)pyridine, prepared as above, dissolved in 160 ml. of glacial acetic acid and 49 ml. of water, there was added 60 g. of zinc dust over the course of 2 hrs. During the addition of the zinc, the reaction temperature was held below 10° C. by means of an ice-salt bath. Without cooling, the reaction mixture was stirred for an additional 2 hrs. following completion of the zinc addition and then the reaction mixture was stirred for an additional 1 hr. at 35° C. 300 ml. of cold water was added and the mixture was filtered. The filter cake was washed several times with water. The filtrate and washings were combined and made strongly alkaline with 6 N sodium hydroxide. During the addition of alkali, ice was added to moderate the heat of neutralization. The alkaline mixture was extracted with ether and the ether extract was washed by extraction with cold water until neutral. The ether solution was dried over anhydrous sodium sulfate and the desiccant was filtered off. The ether was removed on a steam bath to give 5-(N-amino-2-p-bromophenylaminoethyl)-2-methylpyridine.

Preparation of 8-bromo-1,3,4,5-tetrahydro-2-methyl-5-[2-(6-methyl-3-pyridyl)-ethyl]-2H-pyridol[4,3-b]indole A solution of 34 g. of crude 5-(N-amino-2-p-bromophenylaminoethyl)-2-methyl-pyridine, prepared as above, 100 ml. of benzene and 14 g. of 1-methylpiperidone-4 was refluxed for 24 hrs. During the reflux, 2.1 ml. of water was removed from the reaction by means of a Dean-Stark water separator. The reaction mixture was concentrated under reduced pressure on a water bath. 75 ml. of 6.1 N hydrogen chloride in ethanol was added in small portions to the stirred warm residue. After the addition was complete, the reaction mixture was refluxed for 0.5 hrs., cooled to room temperature and poured onto ice. The mixture was made strongly alkaline with 6 N sodium hydroxide and extracted with ether. The ether extract was washed by extraction with water and dried over sodium sulfate. Following removal of the desiccant and the ether, the residue was crystallized from ethyl acetate to give 8-bromo-1,3,4,5-tetrahydro-2-methyl-5-[2-(6-methyl-3-pyridyl)ethyl]-2H-pyrido[4,3-b]indole, M.P. 110–113° C. Recrystallized from ethyl acetate, the product had a melting point of 112–113° C.

9.2 g. of pure base was dissolved in several volumes of ethanol and slight excess of alcoholic hydrogen chloride was added (acid to congo red). The precipitate was filtered and dried to give the dihydrochloride salt, M.P. 262–263° C.

EXAMPLE 5

Preparation of 5-[2-(3,4-dimethylphenylamino)-ethyl]-2-methylpyridine

A mixture of 50 g. of ortho xylidine, 25 g. of 2-methyl-5-vinylpyridine and 1 g. of sodium was heated with stirring on a steam bath for 7 hrs. After the mixture had cooled to room temperature, and with the stirring continued, 30 ml. of ethanol was added followed by 60 ml. of water. The reaction mixture was steam distilled for 7 hrs. When the pot residue had cooled to room temperature, it was extracted with ether (3×300 ml.). The ether extract was washed by extraction with water until neutral and dried over anhydrous sodium sulfate. Following filtration of the desiccant, the ether was removed on a steam bath and the residue (M.P. 70–72°) was recrystallized from hexane to give the base M.P. 73–74°. The base was dissolved in ether and an excess of alcoholic hydrogen chloride was added. Following recrystallization of the precipitate from a solution of ethyl acetate and methanol, 5-[2-(3,4-dimethylphenylamino)ethyl]-2-methylpyridine was obtained as the hydrochloride salt (M.P. 225–227°).

Preparation of 5-[2-(N-nitroso-3,4-dimethylphenyl-amino)ethyl]-2-methylpyridine

A solution of 7.5 g. of sodium nitrite in 30 ml. of water was added dropwise with stirring over the course of 1 hr. to a solution of 24 g. of 5-[2-(3,4-dimethylphenylamino)-ethyl]-2-methylpyridine, 100 ml. of 1 N hydrochloric acid and 50 ml. of ethanol. During the addition, the temperature of the reaction mixture was held near 10° by means of an ice-water bath. After the addition, the temperature was allowed to rise to room temperature with stirring. The reaction mixture was kept at room temperature overnight, and was then cooled to 5°. Following filtration and air drying, 5-[2-(N-nitroso-3,4-dimethylphenylamino)ethyl]-2-methylpyridine was obtained as a tan solid; M.P. 62–65°. A small portion was recrystallized from hexane and the melting point became 69–70°.

Preparation of 5-[2-(N-amino-3,4-dimethylphenyl-amino)ethyl]-2-methylpyridine

To a stirred solution of 50 g. of 5-[2-(N-nitroso-3,4-dimethylphenylamino)ethyl]-2-methylpyridine, 200 ml. of acetic acid and 60 ml. of water was added 50 g. of zinc dust over the course of 1.5 hrs. During the addition of the zinc, the reaction temperature was held below 10° by means of an ice-salt bath. After the addition the mixture was stirred for 1 hr. at 10° and 1 hr. at 40°. Water (300 ml.) was added and the reaction mixture was filtered. The filter cake was washed several times with water. The filtrate and washings were combined and made strongly alkaline with 6 N sodium hydroxide. Ice was added during the addition of alkali to moderate the heat of neutralization. The alkaline mixture was extracted with ether and the ether extract was washed by extraction with water until neutral. When the ether solution had dried over anhydrous sodium sulfate, the desiccant was filtered off. The product remaining after the ether had been evaporated was distilled under reduced pressure to give 5-[2-(N-amino-3,4-dimethylphenylamino)ethyl]-2-methyl-pyridine, B.P. 170–188° at 0.5 mm.

Preparation of 1,3,4,5-tetrahydro-2,8,9-trimethyl-5-[2-(6-methyl-3-pyridyl)ethyl]-2H-pyrido[4,3-b]indole dihydrochloride A stirred solution of 20 g. of 5-[2-(N-amino-3,4-dimethylphenylamino)ethyl]-2-methylpyridine, 15 g. of 1-methylpiperidone-4 and 100 ml. of benzene was heated to reflux. After 18 hrs. under reflux 0.9 ml. of water had been removed from the reaction mixture with a Dean-Stark water trap and the reaction mixture was concentrated under reduced pressure in a water bath. To the stirred residue 50 ml. of 6 N alcoholic hydrogen chloride was added in small (5 ml.) portions. After the addition was complete, the reaction mixture refluxed and stirred an additional ½ hr., allowed to cool to room temperature and poured onto 200 g. of ice. The mixture was made strongly alkaline with 6 N sodium hydroxide and extracted with ether. The ether extract was washed by extraction with water and dried over anhydrous sodium sulfate. Following removal of the desiccant and the ether, the residue was crystallized from ethyl acetate to give the base melting at 139–142°. The base was dissolved in ethanol and a slight excess of 6 N alcoholic hydrogen chloride was added. Several volumes of ether was added. After cooling (5°) for 24 hrs., the salt was filtered and dried to give 1,3,4,5-tetrahydro-2,8,9-trimethyl-5-[2-(6-methyl-3-pyridyl)ethyl]-2H-pyrido[4,3-b]indole dihydrochloride, M.P. 237–238°; U.V. $\lambda_{max.}$ at 225 m$\mu$, $\epsilon$34,000; N.M.R. (base) showed 2 ortho protons on the benzene ring.

EXAMPLE 6

Preparation of 1,3,4,5,-tetrahydro - 2,7,8 - trimethyl - 5- [2-(6-methyl-3-pyridyl)ethyl] - 2H - pyrido - [4.3b]- indole dihydrochloride The filtrate from the crystallization of 1,3,4,5-tetrahydro-2,8,9-trimethyl-5 - [2-(6-methyl - 3-pyridyl)ethyl]- 2H-pyrido[4,3-b]indole from ethyl acetate in Example 5 above was concentrated under reduced pressure and the residue was distilled. The fraction boiling between 210–215° at 0.2 mm. (7 g.) was crystallized from ethyl acetate to give M.P. 111–117°. Following recrystallization from heptane there was obtained 1,3,4,5-tetrahydro-2,7,8-trimethyl-5 - [2-(6-methyl-3-pyridyl)ethyl] - 2H-pyrido- [4,3-b]indole, M.P. 116–117°. The U.V. had a $\lambda_{max.}$ at 228 m$\mu$ and the N.M.R. showed 2 para protons on the benzene ring.

The base was dissolved in ethanol and an excess of 6 N alcoholic hydrogen chloride was added. Several volumes of ether was added and after standing in the refrigerator for a day the salt was filtered and dried to give 1,3,4,5-tetrahydro-2,7,8-trimethyl - 5-[2-(6-methyl - 3-pyridyl)- ethyl] - 2H - pyrido[4,3-b]indole dihydrochloride, M.P. 255–256°.

EXAMPLE 7

Preparation of 5-[2-(m-methylphenylamino)- ethyl]-2-methylpyridine

A stirred mixture of 43 g. of m-toluidine, 48 g. of 2-methyl-5-vinylpyridine and 0.8 g. of sodium was heated on a stream bath for 7 hrs. After the reaction mixture had cooled to room temperature and with the stirring continued, 60 ml. of ethanol was added dropwise followed by 100 ml. of water. The mixture was steam distilled for 7 hrs. When the pot residue had cooled to room temperature it was extracted with ether. The ether solution was washed by extraction with water and dried over anhydrous sodium sulfate. Following removal of the desiccant and the ether, the residue was distilled to give 5- [2 - (m-methylphenylamino)ethyl] - 2 - methylpyridine, B.P. 162–174° at 0.2 mm.; $N_D^{26}$ 1.5886.

Preparation of 5-[2-(N-nitroso-3-methylphenylamino)- ethyl]-2-methylpyridine

A solution of 30 g. of sodium nitrite in 100 ml. of water was added dropwise over the course of 1 hr. to a cooled (+10°), stirred solution of 66 g. of 5-[2-(m-methyl-phenylamino)ethyl]-2-methylpyridine, 410 ml. of 1 N hydrochloric acid and 400 ml. of ethanol. After the addition, the reaction mixture was stirred 1 hr. at ice bath temperature and then 5 hrs. at room temperature. Excess sodium chloride was added to the reaction mixture and the mixture was extracted with ether. After the ether extract had dried over anhydrous sodium sulfate, the desiccant was filtered off and the filtrate was concentrated to dryness on a water bath under reduced pressure to give 5-[2-(N-nitroso-3-methylphenylamino)ethyl] - 2-methyl- pyridine, M.P. 58–60°. A small portion was recrystallized from hexane and the melting point remained 58–60°.

Preparation of 5-[2-(N-amino-3-methylphenylamino)- ethyl]-2-methylpyridine

To a stirred, cooled solution of 69 g. of 5-[2-(N-nitroso-3-methylphenylamino)ethyl] - 2-methylpyridine, 300 ml. of acetic acid and 69 ml. of water was added in small portions over the course of 2 hrs. 80 g. of zinc dust. The temperature of the reaction mixture was held below 10° by means of an ice-salt bath. After the addition, the reaction mixture was stirred an additional 1 hr. between 0–10° and then stirred 1 hr. between 35–40°. Water (400 ml.) was added and the mixture was filtered. The filter cake was washed several times with water. The filtrate and the washings were combined and made strongly alkaline with 6 N sodium hydroxide. Ice was added during the addition of alkali in order to moderate the heat of neutralization. The alkaline mixture was extracted with ether and the ether extract was washed by extraction with water until neutral. When the ether solution had dried over anhydrous sodium sulfate, the desiccant was filtered off. Following evaporation of the ether there was obtained 5 - [2-(N-amino - 3-methylphenyl-amino)ethyl]-2-methylpyridine as a viscous oil remained.

Preparation of 1,3,4,5-tetrahydro - 2,7 - dimethyl - 5-[2- (6-methyl-3 - pyridyl)ethyl] - 2H - pyrido[4,3-b]indole dihydrochloride methanolate A solution of 15 g. of 5-[2-(N-amino-3-methylphenyl-amino)ethyl]-2-methylpyridine, 10 g. of 1-methylpiperi-done-4 and 75 ml. of benzene was heated (8 hrs.) under reflux until 0.8 ml. of water had been removed by means of a Dean-Stark trap. The reaction mixture was concentrated under reduced pressure. In small portions (co. 10 ml.), 50 ml. of 7 N alcoholic hydrogen chloride was aded carefully to the stirred residue. After the addition the mixture was refluxed and stirred an additional ½ hr. and poured onto ice. The pH was made greater than 10 with 6 N sodium hydroxide and the mixture was extracted with ether. In turn, the ether extract was washed by extraction with water and dried over anhydrous sodium sulfate. Following removal of the desiccant by filtration, the ether was evaporated from the filtrate and the residue was distilled to give 1,3,4,5-tetrahydro-2,7-dimethyl-5-[2-(6-methyl - 3-pyridyl)ethyl] - 2H-pyrido- [4,3-b]indole, B.P. 190–205° at 0.1 mm. The distillate was dissolved in methanol and an excess of alcoholic hydrogen chloride was added followed by several volumes of ether. The mixture was filtered and the precipitate was dried to give 1,3,4,5-tetrahydro - 2,7-dimethyl - 5-[2-(6-methyl-3-pyridyl)ethyl] - 2H-pyrido-[4,3-b]indole dihydrochloride methanolate. Following 2 recrystallizations from a solution of methanol and ethyl acetate the product had M.P. 212–214°. U.V. $\lambda_{max.}$ 222 m$\mu$, $\epsilon$37,500. N.M.R. compatible and also shows methanol of crystallization.

EXAMPLE 8

Preparation of 5-[2-(m-chlorophenylamino)- ethyl]-2-methylpyridine

A stirred mixture of 64 g. of m-chloroaniline, 59.5 g. of 2-methyl-5-vinylpyridine and 1.4 g. of sodium was heated on a steam bath for 7 hrs. The mixture was allowed to cool to room temperature and with the stirring continued, 60 ml. of ethanol was added followed by 100 ml. of water. The mixture was steam distilled for 7 hrs. After the pot residue had cooled to room temperature, it was extracted with ether. The ether extract was washed by extraction with water until neutral and dried over anhydrous sodium sulfate. Following removal of the desiccant by filtration, the ether was evaporated from the solution and the residue was distilled to give 5-[2-(m-chloro-phenylamino)ethyl]-2-methylpyridine, B.P. 165–173° at 0.2 mm.

Preparation of 5-[2-(N-nitroso-m-chlorophenylamino)ethyl]-2-methylpyridine

A solution of 24 g. of sodium nitrite in 70 ml. of water was added dropwise over the course of 1 hr. to a cooled (+10°) stirred solution of 76 g. of 5-[2-(m-chlorophenylamino)ethyl] - 2 - methylpyridine, 325 ml. of 1 N hydrochloric acid and 300 ml. of ethanol. Following the addition, the mixture was stirred an additional 3 hrs. at 10° and left overnight at room temperature. The mixture was again cooled with stirring and filtered. When the precipitate had been washed several times with water, it was air dried for 14 hrs. to yield 5-[2-(N-nitroso - m - chlorophenylamino)ethyl] - methylpyridine, M.P. 49–52°.

Preparation of 5-[2-(N-amino-m-chlorophenylamino)ethyl]-2-methylpyridine

In small portions, 95 g. of zinc dust was added over the course of 2 hrs, to a cooled (<10°), stirred solution of 89 g. of 5 - [2 - (N - nitroso - m - chlorophenylamino)ethyl] - 2 - methylpyridine, 350 ml. of glacial acetic acid and 90 ml. of water. After the addition, the mixture was stirred 2 hrs. with the temperature held between 0–10° and then stirred an additional 1 hr. between 35–40°. Water (500 ml.) was added and the reaction mixture was filtered. The filter cake was washed several times with water. The filtrate and the washing were combined and made strongly alkaline with 6N sodium hydroxide. The alkaline mixture was extracted with ether and in turn the ether extract was washed by extraction with water until neutral. After the ether extract had dried over anhydrous sodium sulfate, the desiccant was filtered off and the ether was evaporated on a water bath to give 5 - [2 - (N - amino - m - chlorophenylamino)ethyl]-2-methylpyridine.

Preparation of 7 - chloro - 1,3,4,5 - tetrahydro - 2-methyl - 5 - [2 - (6 - methyl - 3 - pyridyl)ethyl] - 2H-pyrido[4,3 - b]indole dihydrochloride monohydrate A stirred solution of 15 g. of 5 - [2 - (N - amino - m-chlorophenylamino)ethyl] - 2 - methylpyridine, 10 g. of 1 - methylpiperidone - 4 and 50 ml. of benzene was refluxed for 16 hrs. During this time, 0.9 ml. of water was removed from the reaction mixture by means of a Dean-Stark trap. The reaction mixture was then concentrated under reduced pressure on a water bath. To the residue, 50 ml. of 6.1 N alcoholic hydrogen chloride was added in small portions. After the addition, the mixture was refluxed and stirred ½ hr. and poured onto ice. The pH was made greater than 10 with 6N sodium hydroxide and the alkaline mixture was extracted with ether. The ether extract was washed by extraction with water until neutral. After the ether solution had dried over anhydrous sodium sulfate, the desiccant was filtered off and the ether was evaporated from the solution. The residue was crystallized from ethyl acetate to give 7 - chloro-1,3,4,5 - tetrahydro - 2 - methyl - 5 - [2 - (6 - methyl-3 - pyridyl)ethyl] - 2H - pyrido[4,3 - b]indole, M.P. 124–125°. Following a second crystallization from ethyl acetate, the base had M.P. 126–127°. U.V. $\lambda_{max.}$ 234 m$\mu$, $\epsilon$37,900; N.M.R. confirms structure.

A solution of 3 g. of the base in methanol was made acid to congo red with alcoholic hydrogen chloride and several volumes of ethyl acetate was added. Following refrigeration, the dihydrochloride salt was collected and after air drying there was obtained 7 - chloro - 1,3,4,5-tetrahydro - 2 - methyl - 5 - [2 - (6 - methyl - 3 - pyridyl)ethyl] - 2H - pyrido[4,3 - b]indole dihydrochloride monohydrate, M.P. 254–255°.

EXAMPLE 9

Preparation of 5-[2-(3,4-dichlorophenylamino)ethyl]-2-methyl-pyridine

A stirred mixture of 35 g. of 3,4 - dichloroaniline, 23 g. of 2 - methyl - 5 - vinylpyridine and 1 g. of sodium was heated on a steam bath for 7 hrs. After the mixture had cooled to room temperature, 60 ml. of ethanol was added followed by 60 ml. of water. The mixture was steam distilled for 5 hrs. When the pot residue had cooled to room temperature, it was extracted with ether. The ether extract was washed by extraction with water until neutral and dried over anhydrous sodium sulfate. Following filtration of the desiccant, and evaporation of the ether, the residue was crystallized from ethyl acetate to yield 5 - [2 - (3,4 - dichlorophenylamino)ethyl] - 2-methylpyridine, M.P. 111–112°.

Preparation of 5-[2-(N-nitroso-3,4-dichlorophenylamino)ethyl]-2-methylpyridine A solution of 5 g. of sodium nitrate in 40 ml. of water was added dropwise over the course of 1 hr. to a cooled (+10°) stirred solution of 16 g. of 5 - [2 - (3,4 - dichlorophenylamino)ethyl] - 2 - methylpyridine, 60 ml. of ethanol and 65 ml. of 1 N hydrochloric acid. After the addition, the reaction mixture was stirred for 3 hrs. at ice bath temperature and then 1 hr. at room temperature. The mixture was filtered. After air drying, there was obtained 5 - [2 - (N - nitroso - 3,4 - dichlorophenylamino) ethyl]-2-methylpyridine, M.P. 66–68°.

Preparation of 5-[2-(N-amino-3,4-dichlorophenylamino)ethyl]-2-methylpyridine Twenty-five grams of zinc dust was added to a stirred cooled solution of 20 g. of 5 - [2 - (N - nitroso - 3,4-dichlorophenylamino)ethyl] - 2 - methylpyridine, 80 ml. of glacial acetic acid and 20 ml. of water. During the addition, the temperature was held below 10° by means of an ice-salt bath. After the addition, the reaction mixture was stirred an additional hour between 0–10° and then 1 hr. between 35–40°. Water (200 ml.) was added and the reaction mixture was filtered. The filter cake was washed several times with water. The filtrate and washings were combined and made strongly alkaline with 6N sodium hydroxide. Ice was added to moderate the heat of neutralization. The akaline mixture was extracted with ether and the ether extract was washed by extraction with water until neutral. When the ether solution had dried over anhydrous sodium sulfate, the desiccant was filtered off. Following evaporation of the ether, 5 - [2-(N - amino - 3,4 - dichlorophenylamino)ethyl] - 2-methylpyridine was obtained as a viscous oil.

Preparation of 7,8-dichloro-1,3,4,5-tetrahydro-2-methyl-5-[2 - (6 - methyl - 3 - pyridyl)ethyl] - 2H - pyrido[4,3-b]indole dihydrochloride methanolate A stirred solution of 15.8 g. of 5-[2-(N-amino-3,4-dichlorophenylamino)ethyl] - 2 - methylpyridine, 8 g. of 1-methylpiperidone-4 and 70 ml. of benzene was heated to reflux. After 11 hrs under reflux, 0.7 ml. of water had been removed from the reaction by means of a Dean-Stark trap and the reaction mixture was concentrated under reduced pressure in a water bath. To the stirred residue, 50 ml. of 7 N alcoholic hydrogen chloride was added in small portions (5 ml.). After the addition was complete, the reaction was refluxed and stirred an additional ½ hr., allowed to cool to room temperature and poured onto ice (200 g.). The mixture was made strongly alkaline with 6 N sodium hydroxide and extracted with ether. The ether extract was washed by extraction with water and dried over anhydrous sodium sulfate. Following removal of the desiccant and the ether, the residue was crystallized from 50 ml. of ethyl acetate to yield 7,8 - dichloro - 1,3,4,5 - tetrahydro - 2 - methyl - 5[2-(6-methyl-3-pyridyl)ethyl]-2H-pyrido[4,3-b]indole, M.P. 150–152°; U.V. $\lambda_{max.}$ 238 m$\mu$, $\epsilon$ 32,500. N.M.R. shows 2 para aromatic protons (443 and 428 cps.). A small portion was recrystallized 2 times more from ethyl acetate and the melting point became 151.5 to 152°.

The base (3.8 g.) was dissolved in methanol and a slight excess of 6 N alcoholic hydrogen chloride was added. Several volumes of ether was added. After cooling (5°) for 24 hrs., the salt was filtered and dried. Following a recrystallization from ethyl acetate and methanol, there was obtained 7,8-dichloro-1,3,4,5-tetrahydro-2-methyl - 5 - [2-(6-methyl-3-pyridyl)ethyl]-2H-pyrido[4,3-b]indole dihydrochloride methanolate, M.P. 261–262°.

EXAMPLE 10

Preparation of 5-[2-(4-chloro-3-methylphenylamino)ethyl]-2-methylpyridine

A stirred mixture of 30 g. of 4-chloro-3-methylaniline, 25 g. of 2-methyl-5-vinylpyridine and 2 g. of sodium was heated between 100 to 105° for 6 hrs. After the reaction had cooled to room temperature and with the stirring continued, 30 ml. of ethanol was added followed by 80 ml. of water. The mixture was steam distilled for 7 hrs. and when the pot residue had cooled to room temperature, it was extracted with ether. In turn, the ether extract was washed with water until neutral and dried over anhydrous sodium sulfate. Following filtration of the desiccant and evaporation of the ether, the residue was distilled yielding 5-[2-(4-chloro-3-methylphenylamino)ethyl]-2-methylpyridine, B.P. 195–203° at 0.12 mm.; M.P. 95–98°.

Preparation of 5-[2-(N-nitroso-4-chloro-3-methylphenylamino)-ethyl]-2-methylpyridine A solution of 8.6 g. of sodium nitrite in 50 ml. of water was added dropwise over the course of 20 min. to a stirred, cooled (+10°) solution of 30 g. of 5-[2-(4-chloro - 3 - methylphenylamino)ethyl]-2-methylpyridine, 120 ml. of 1 N hydrochloric acid and 100 ml. of ethanol. After the addition, the reaction mixture was stirred an additional 3 hrs. at 0–5° and allowed to stand 18 hrs. at room temperature. The mixture was again cooled to +3°, filtered and air dried yielding 5-[2-nitroso-4-chloro-3-methylphenylamino)ethyl] - 2 - methylpyridine, M.P. 80–82°.

Preparation of 5-[2-(N-amino-4-chloro-3-methylphenylamino)ethyl]-2-methylpyridine In small portions, over the course of 1.5 hrs., 45 g. of zinc dust was added to a cooled (<10°, ice-salt bath) stirred solution of 30 g. of 5-[2-(N-nitroso-4-chloro-3-methylphenylamino)ethyl]-2-methylpyridine, 120 ml. of glacial acetic acid and 30 ml. of water. After the addition of zinc, the mixture was stirred 1.5 hrs. at 3–10° and 1 hr. at 35–40°. Water (300 ml.) was added and the mixture was filtered. The filter cake was washed several times with water. The filtrate and washings were combined. Sodium hydroxide (6 N) and ice were added until the mixture was strongly alkaline. The mixture was extracted with ether and in turn the ether extract was washed by extraction with water until neutral. After drying over anhydrous sodium sulfate, the desiccant was filtered off and the ether was evaporated under reduced pressure yielding 5-[2-(N-amino-4-chloro-3-methylphenylamino)ethyl]-2-methylpyridine as a dark brown viscous oil.

Preparation of 8-chloro-1,3,4,5-tetrahydro-2,7-dimethyl-5-[2 - (6 - methyl-3-pyridyl)ethyl]-2-H-pyrido[4,3-b]indole dihydrochloride A stirred solution of 20 g. of 5-[2-(N-amino-4-chloro-3-methylphenylamino)ethyl]-2-methylpyridine, 20 g. of 1-methylpiperidone-4 and 100 ml. of benzene was heated. After 4 hrs. at reflux temperature, 1.2 ml. of water had been removed from the reaction mixture by means of a Dean-Stark trap and the volatile components were removed on a water bath under reduced pressure. To the stirred, warm residue 80 ml. of 6.1 N ethanolic hydrogen chloride was added in small portions. Following the addition, the reaction mixture was stirred at reflux temperature for ½ hr. When the reaction had cooled (40°) it was poured onto ice and the mixture was made alkaline with 6 N sodium hydroxide. The liberated base was extracted with ether. In turn, the ether layer was washed by extraction with water until neutral and dried over anhydrous sodium sulfate. Following filtration of the desiccant and evaporation of the ether, the residue was crystallized from 130 ml. of ethyl acetate to give the base M.P. 136–138°. Following a second crystallization from ethyl acetate, there was obtained 8-chloro-1,3,4,5-tetrahydro - 2,7-dimethyl-5-[2-(6-methyl-3-pyridyl)ethyl]-2H-pyrido[4,3-b]indole, M.P. 137.5–139.5°. U.V. λmax. 236 mμ, ε 40,500; N.M.R. showed 2 para benzene protons.

The base (4 g.) was dissolved in a minimum amount of methanol and a slight excess of ethanolic hydrogen chloride was added. After refrigeration, filtration, and drying, there was obtained 8-chloro-1,3,4,5-tetrahydro-2,7-dimethyl - 5 - [2 - (6 - methyl - 3 - pyridyl)ethyl] - 2H-pyrido[4,3-b]indole dihydrochloride, M.P. 268–269°.

EXAMPLE 11

Preparation of 5-[2-(4-chloro-2-methylphenylamino)ethyl]-2-methylpyridine

A stirred mixture of 50 g. of 4-chloro-2-methylaniline, 36 g. of 2-methyl-5-vinylpyridine and 1 g. of sodium was heated on a steam bath for 7 hrs. After the mixture had cooled to room temperature and with the stirring continued, 60 ml. of ethanol was added, followed by 50 ml. of water. The mixture was steam distilled for 5 hrs. When the pot residue had cooled to room temperature, it was extracted with ether. The ether extract was washed by extraction with water and dried over anhydrous sodium sulfate. Following filtration of the desiccant and evaporation of the ether, there was obtained solid 5-[2-(4-chloro-2-methylphenylamino)ethyl]-2-methylpyridine.

Preparation of 5[2-(N-nitroso-4-chloro-2-methylphenylamino)-ethyl]-2-methylpyridine A solution of 11 g. of sodium nitrite in 50 ml. of water was added over the course of 1 hr. to a stirred cooled (+10°) solution of 37 g. of 5-[2-(4-chloro-2-methylphenylamino)ethyl]-2-methylpyridine, 150 ml. of ethanol and 150 ml. of 1 N hydrochloric acid. After the addition, the reaction mixture was stirred 1 hr. at ice bath temperature and 4 hrs. at room temperature. The reaction mixture was extracted with ether and the ether extract was washed by extraction with water and dried over anhydrous sodium sulfate. Following filtration of the desiccant and evaporation of the ether, 5-[2-(N-nitroso-4-chloro-2-methylphenylamino)ethyl] - 2-methylpyridine was obtained.

Preparation of 5-[2-(N-amino-4-chloro-2-methylphenylamino)ethyl]-2-methylpyridine To a cooled stirred solution of 38.5 g. of 5-[2-(N-nitroso-4-chloro-2-methylphenylamino)ethyl] - 2-methylpyridine, 160 ml. of acetic acid and 40 ml. of water was added in small portions over the course of 2 hrs., 80 g. of zinc dust. During the addition, the temperature was held below 10° by means of an ice-salt bath. After the addition, the reaction mixture was stirred an additional 2 hrs. between 0–10° and 1 hr. at 40°. Water (500 ml.) was added and the mixture was filtered. The filter cake was washed with water. The washings and filtrate were combined and made strongly alkaline with 6 N sodium hydroxide. The alkaline mixture was extracted with ether and the ether extract was washed by extraction with water until neutral. When the ether solution had dried over anhydrous sodium sulfate, the desiccant was filtered off. Following evaporation of the ether, 5-[2-(N-amino - 4 - chloro-2-methylphenylamino)ethyl]-2-methylpyridine was obtained as a viscous oil.

Preparation of 8-chloro-1,3,4,5-tetrahydro-2,6-dimethyl-5-[2-(6-methyl-3-pyridyl)ethyl] - 2H - pyrido[4,3 - b]indole dihydrochloride monohydrate A stirred mixture of 10 g. of 5-[2-(N-amino-4-chloro-2-methylphenylamino)ethyl]-2-methylpyridine, 10 g. of 1-methylpiperidone-4 and 70 ml. of benzene was heated to reflux. After 18 hrs. under reflux, 0.2 ml. of water had been removed from the reaction mixture by means of a Dean-Stark trap, and the reaction mixture was concentrated under reduced pressure on a water bath. To the stirred residue, 50 ml. of 6.1 N alcoholic hydrogen chloride was added in small portions (5 ml.). After the addition was completed, the reaction mixture was refluxed and stirred an additional ½ hr., allowed to cool to room temperature, and poured onto ice. The pH was made greater than 10 with 6 N sodium hydroxide and the mixture was extracted with ether. The ether extract was washed by extraction with water until neutral and dried over anhydrous sodium sulfate. Following filtration of the desiccant and evaporation of the ether, the residue was crystallized from ethyl acetate to give 8-chloro-1,3,4,5-tetrahydro-2,6-dimethyl-5-[2 - (6 - methyl - 3 - pyridyl) ethyl]-2H-pyrido[4,3-b]indole, M.P. 146–151°. Upon a recrystallization from ethyl acetate, the melting point became 149–152°; U.V. $\lambda_{max}$. 234 m$\mu$, $\epsilon$ 41,000.

The base (2.5 g.) was dissolved in methanol and a slight excess of alcoholic hydrogen chloride was added. Several volumes of ethyl acetate was added. Upon cooling (5°) for 24 hrs., the hydrochloride salt was filtered and dried to give 8 - chloro-1,3,4,5-tetrahydro - 2,6-dimethyl - 5 - [2 - (6 - methyl - 3 - pyridyl)ethyl]-2H-pyrido[4,3-b]indole dihydrochloride monohydrate, M.P. 179–182°.

EXAMPLE 12

Preparation of 5-[2-(3-chloro-4-methylphenylamino) ethyl]-2-methylpyridine

A stirred mixture of 50 g. of 3-chloro-4-methylaniline, 36 g. of 2-methyl-5-vinylpyridine and 1 g. of sodium was heated on a steam bath for 7 hrs. After the reaction had cooled to room temperature 30 ml. of ethanol was added followed by 60 ml. of water. The resulting mixture was steam distilled for 7 hrs. After the pot residue had cooled to room temperature, it was extracted with ether. In turn the ether extract was washed by extraction with water until neutral and dried over anhydrous sodium sulfate. Following filtration of the desiccant and evaporation of the ether 5-[2-(3-chloro-4-methylphenylamino)-ethyl]-2-methylpyridine, M.P. 104–109°, was obtained. Upon recrystallizing a small portion of the crude base from hexane the melting point became 114–116°.

Preparation of 5-[2-(N-nitroso-3-chloro-4-methylphenylamino)-ethyl]-2-methylpyridine A solution of 22 g. of sodium nitrite in 100 ml. of water was added dropwise over the cource of 1 hr. to a cooled (+10°) solution of 74.1 g. of 5-[2-(3-chloro-4-methylphenylamino)ethyl]-2-methylpyridine, 300 ml. of ethanol and 300 ml. of 1 N hydrochloric acid. After the addition the reaction mixture was stirred for 5 hrs. between 0–10°. Following filtration and air drying 5-[2-(N - nitroso - 3 - chloro-4-methylphenylamino)ethyl]-2-methylpyridine, M.P. 78–81°, was obtained.

Preparation of 5-[2-(N-amino-3-chloro-4-methylphenyl-amino)ethyl]-2-methylpyridine In small portions over the course of 1.5 hrs., 85 g. of zinc dust was added to a previously cooled solution (0°) of 75 g. of 5-[2-(N-amino-3-chloro-4-methylphenyl-amino)ethyl]-2-methylpyridine, 300 ml. of acetic acid and 75 ml. of water. During the addition the temperature was held below 10° by means of an ice-salt bath. After the addition the reaction mixture was stirred at 0° for 2 hrs. and then stirred for 1 hr. at 40°. Water (500 ml.) was added and the reaction mixture was filtered. The filter cake was washed several times with cold water. The filtrate and the washings were combined and made strongly alkaline with 6 N sodium hydroxide. The alkaline mixture was extracted with ether and in turn the ether extract was washed by extraction with water until neutral. After the ether solution had dried over anhydous sodium sulfate, the desiccant was filtered off and the ether was evaporated on a water bath yielding 5-[2-(N-amino-3-chloro-4-methylphenylamino)ethyl]-2-methylpyridine as a viscous oil.

Preparation of 7-chloro-1,3,4,5-tetrahydro-2,8-dimethyl-5 - [2 - (6 - methyl-3-pyridyl)ethyl]-2H-pyrido[4,3-b] indole dihydrochloride A stirred mixture of 10 g. of 5-[2-(N-amino-3-chloro-4-methylphenylamino)ethyl]-2-methylpyridine, 10 g. of 1-methyl-piperidone-4 and 70 ml. of benzene was refluxed for 4 hrs. During this period, 0.7 ml. of water was removed from the reaction by means of a Dean-Stark trap. After the volatile components had been removed under reduced pressure on a water bath, 50 ml. of 6.1 N alcoholic hydrogen chloride was added in small portions to the residue. When the addition had been completed, the reaction mixture was refluxed and stirred an additional ½ hr., allowed to cool to room temperature and poured onto ice. Sodium hydroxide (6 N) was added until the mixture was strongly alkaline and the liberated base was then extracted with ether. In turn, the ether solution was washed by extraction with water until neutral. After the ether solution had dried over anhydrous sodium sulfate, the desiccant was filtered from the solution and the ether was removed on a water bath. The residue was triturated with hexane to give the base M.P. 94–104°. Following 2 recrystallizations from ethyl acetate 7-chloro - 1,3,4,5 - tetrahydro - 2,8 - dimethyl - 5- - [2 - (6 - methyl - 3 - pyridyl)ethyl] - 2H - pyrido[4,3 - b] - indole, M.P. 125–127°, was obtained. U.V. $\lambda_{max}$. 233 m$\mu$, $\epsilon$ 36,100; N.M.R. 2-para benzene protons.

The base (1.4 g.) was dissolved in methanol and hydrogen chloride gas was passed into the solution until it was acid to Congo red. Several volumes of ethyl acetate was added and following refrigeration, filtration, and drying 7 - chloro - 1,3,4,5 - tetrahydro - 2,8 - dimethyl - 5 - [2 - (6 - methyl -3 - pyridyl)ethyl] -2H - pyrido [4,3-b]indole dihydrochloride was obtained, M.P. 266–267°.

EXAMPLE 13

Preparation of 5 - [2 - (3 - trifluoromethylphenylamino) ethyl]-2-methylpyridine A stirred mixture of 36.2 g. of m-aminobenzotrifluoride, 24 g. of 2-methyl-5-vinylpyridine and 1 g. sodium was heated at 100° for 5 hrs. (the initial heat of reaction caused the reaction temperature to climb to 145° for a short period of time). When the stirred reaction mixture had cooled to room temperature, 60 ml. of ethanol was added to the reaction mixture followed by 60 ml. of water. The mixture was then steam distilled for 7 hrs. and after the pot residue had been cooled by the addition of ice, it was extracted with ether. The ether extract was washed by extraction with water until neutral and dried over anhydrous sodium sulfate. Following filtration of the desiccant and evaporation of the ether, 5 - [2 - (3 - trifluoromethylphenylamino)ethyl] - 2 - methylpyridine remained as a brown solid. A small portion was crystallized from ethyl acetate to give a melting point of 87–89°.

Preparation of 2 - methyl - 5 - [2 - (N -nitroso - 3 - trifluoromethylphenylamino) ethyl] - pyridine A solution of 5 g. of sodium nitrite in 50 ml. of water was added dropwise over the course of 1 hr. with stirring to a cooled (+10°) solution of 16 g. of 5-[2-(3-trifluoromethylphenylamino) - ethyl] - 2 methylpyridine, 50 ml. of ethanol and 65 ml. of 1 N hydrochloric acid. After the addition the mixture was stirred for 5 hrs. at 0–10°. The precipitate was filtered and air dried, yielding 2 - methyl - 5 - [2 -(N - nitroso - 3 - trifluoromethylphenyl-amino) - ethyl]-pyridine.

Preparation of 5 - [2 - (N - amino - 3 - trifluoromethyl-phenylamino)ethyl] 2 - methylpyridine Over the course of 1.5 hrs., 20 g. of zinc dust was added to a stirred cooled (<10°, with ice-salt bath) solution of 15 g. of 5-[2-(N-nitroso-3-trifluoromethylphenylamino)ethyl]-2-methylpyridine, 60 ml. of glacial acetic acid and 15 ml. of water. After the addition the mixture was stirred for 1 hr. at 0–10°, then for 1 hr. at 35–40°. Water (200 ml.) was added and the mixture was filtered. The filter cake was washed several times with water. The filtrate and washings were combined and made strongly alkaline with 6 N sodium hydroxide. Ice was added to moderate the temperature. The liberated base was extracted with ether. In turn the ether extract was washed by extraction with water until neutral and dried over anhydrous sodium sulfate. Following filtration of the desiccant and evaporation of the ether, 5-[2-(N-amino - 3 - trifluoromethylphenylamino)ethyl] - 2 - methylpyridine was obtained.

Preparation of 1,3,4,5 - tetrahydro - 2 - methyl - 5 -[2 - (6 - methyl - 3 - pyridyl)ethyl] - 7 - trifluoromethyl - 2H - pyrido[4,3-b] indole dihydrochloride monohydrate A stirred solution of 13.5 g. of 5-[2-(N-amino-3-trifluoro - methylphenylamino)ethyl] - 2 - methylpyridine, 15 g. of 1-methyl-piperidone-4 and 100 ml. of benzene was refluxed for 5 hrs. During this time 0.7 ml. of water was removed from the reaction mixture by means of a Dean-Stark water trap. The reaction mixture was concentrated under reduced pressure in a water bath and 70 ml. of 6.1 N alcoholic hydrogen chloride was added to the stirred residue in small portions. After the addition, the reaction was refluxed and stirred ½ hr. and poured onto ice. The pH of the mixture was made greater than 10 with 6 N sodium hydroxide and the alkaline mixture was extracted with ether. In turn, the ether extract was washed with water until neutral and dried over anhydrous sodium sulfate. Following filtration of the desiccant and evaporation of the ether, a crude residue was obtained which upon crystallization from ethyl acetate gave the base M.P. 147–150°. A recrystallization from ethyl acetate yielded 1,3,4,5,-tetrahydro-2-methyl-5-[2-6-methyl-3 - pyridyl)ethyl] - 7 - trifluoromethyl - 2H - pyrido - [4,3-b]indole, M.P., 152–153°. U.V. $\lambda_{max.}$ 235 m$\mu$, $\epsilon$ 33,500; N.M.R. shows 2-ortho and 1-meta benzene protons.

The base (1.2 g.) was dissolved in methanol and an excess of alcoholic hydrogen chloride was added, followed by several volumes of ethyl acetate. After refrigeration for 18 hrs., the salt was filtered and dried yielding 1,3,4,5-tetrahydro - 2 - methyl - 5 - [2-(6-methyl-3-pyridyl) ethyl] - 7 - trifluoromethyl - 2H - pyrido[4,3b]indole dihydrochloride monohydrate, M.P. 261–263°.

By analogous procedure there is also prepared 1,3,4,5- tetrahydro - 2 - methyl - 5 - [2-(6-methyl-3-pyridyl)-ethyl] - 8 - trifluoromethyl - 2H - pyrido[4,3-b]indole.

EXAMPLE 14

Preparation of 2-methyl-5-(2-p-tolylaminoethyl)pyridine

A mixture of 128.5 g. of p-toluidine, 72 g. of 2-methyl-5-vinylpyridine and 2.8 g. of sodium was heated with stirring on a steam bath. After 5 hrs., the reaction was allowed to cool to room temperature and 30 ml. of ethanol was added dropwise with stirring followed by 30 ml. of water. The mixture was then steam distilled for 7 hrs. When the pot residue had cooled to room temperature, it was extracted 3 times with 300 ml. of ether. The ether portions were combined and washed with water until neutral. After the ether solution had dried over anhydrous sodium sulfate, the desiccant was filtered off. Following the removal of the ether the residue was distilled under reduced presure, B.P. 176–180° at 0.5 mm. The distillate crystallized on the receiver yielding 2-methyl-5-(2-p-tolyl-aminoethyl)pyridine M.P. 64–65°.

Preparation of 2-methyl-5-(N-nitroso-2-p-tolylaminoethyl)pyridine

To a solution of 440 ml. of 1N hydrochloric acid and 400 ml. of ethanol was added 100 g. of 2-methyl-5-(p-tolylaminoethyl)-pyridine. The mixture was stirred at room temperature until complete solution was obtained (approx. ½ hr.) and then cooled to +8°. A solution of 31 g. of sodium nitrite in 200 ml. of water was added dropwise with stirring with the temperature maintained near 5°, by means of an ice bath. Following the last addition the reaction mixture was allowed to warm slowly to room temperature with stirring. The mixture was again cooled in an ice bath and then filtered. The filter cake was washed several times with water and allowed to air dry yielding 2-methyl-5-(N-nitroso-2-p-tolylaminoethyl) pyridine, M.P. 75–77°.

Preparation of 2-methyl-5-(N-amino-2-p-tolylaminoethyl) pyridine

To a stirring solution of 92 g. of 2-methyl-5-(N-nitroso-2-p-tolylaminoethyl)pyridine in 400 ml. of glacial acetic acid and 120 ml. of water was added 180 g. of zinc dust over the course of 4 hrs. The reaction temperature was held between 5–10° during the addition by means of an ice-salt bath. After the addition was over, the reaction mixture was stirred at 4° for 1 hr. and then allowed to stir at room temperature for 3 hrs. The reaction mixture was filtered and the filter cake was washed several times with water. The filtrate and the washings were combined and made strongly alkaline with 6 T sodium hydroxide. During the addition of caustic the temperature was held below 10° by addition of ice. The alkaline mixture was extracted with ether (4 x 300 ml.) and in turn the ether extracts were washed by extraction with cold water (4×100 ml.). When the ether extract had dried over anhydrous sodium sulfate, the desiccant was filtered off. The ether was stripped from the solution on a water bath and the residue was distilled in vacuum, B.P. 167–172° at 0.5 mm. During the distillation the base crystallized in the receiver yielding 2-methyl-5-(N-amino-2-p-tolyl-aminoethyl)pyridine, M.P. 55–60°.

Preparation o f 2-benzyl-8-methyl-1,3,4,5-tetrahydro-5-[2- (6 - methyl-3-pyridyl)ethyl]2H - pyridol[4,3-b]indole dihydrochloride A stirred solution of 10 g. of 5-[2-(N-amino-4-methylphenyl-amino)ethyl]-2-methylpyridine, 10 g. of 1-benzyl-piperidone-4 and 70 ml. of benzene was heated at reflux for 17 hrs. while 0.6 ml. of water was removed from the reaction by means of a Dean-Stark water trap. After the benzene had been distilled from the reaction mixture under reduced pressure, 50 mls. of 6.1 N alcoholic hydrogen chloride was added to the stirred residue in small portions. When the addition was completed, the reaction mixture was refluxed and stirred an additional ½ hr., allowed to cool to room temperature and poured onto ice. Sodium hydroxide (6 N) was added until the mixture was strongly alkaline and the liberated base was extracted with ether. In turn, the ether extract was washed by extraction with water until neutral. After the ether solution had dried over anhydrous sodium sulfate, the disiccant was filtered from the solution and the ether was removed on a water bath. The residue was dissolved in methanol and an excess of alcoholic hydrogen chloride was added. Several volumes of ethyl acetate was added and following refrigeration, filtration and drying, the salt was obtained, M.P. 232–234°. Upon recrystallization from ethyl acetate and methanol, there was obtained 2-benzyl-8-methyl-1,3,4,5-tetrahydro-5 - [2 - (6 - methyl-3-pyridyl)-ethyl] - 2H - pyrido[4,3 - b]indole dihydrochloride, M.P. 246–247°.

U.V. $\lambda_{max.}^{isoPrOH}$ 235 m$\mu$, $\epsilon$ 34,500.

EXAMPLE 15

Preparation of 1,3,4,5-tetrahydro - 8 - methyl-5-[2(6-methyl - 3 - pyridyl)ethyl] - 2H - pyridol[4,3-b]indole dihydrochloride A mixture of 5 g. of 2-benzyl-8-methyl-1,3,4,5-tetrahydro-5-[2-(6-methyl-3-pyridyl)ethyl] - 2H-pyrido[4,3-b]-indole dihydrochloride, 2.5 g. of 10% palladium on carbon and 140 ml. of methanol was placed in a Parr hydrogenation apparatus. After shaking for 3.5 hrs. at 55° under an atmosphere of hydrogen (initial pressure 3.7 atm.) slightly more than the theoretical amount of hydrogen had been absorbed. The reaction was stopped and the catalyst was filtered from the mixture. The filtrate was concentrated to dryness under reduced pressure. Upon crystallization of the residue from a solution of ethyl acetate and methanol, there was obtained 1,3,4,5-tetrahydro-8-methyl-5-[2-(6 - methyl - 3 - pyridyl)ethyl] - 2H - pyrido[4,3-b]indole dihydrochloride, M.P. 259–261°. Two further recrystallizations from a solution of ethyl acetate and methanol yielded the product with melting point 268–269°.

U.V. $\lambda_{max.}^{isoPrOH}$ 224–225 m$\mu$, $\epsilon$ 35,500.

EXAMPLE 16

Pharmaceutical formulations incorporating representative products of this invention were prepared as follows:

8-chloro-1,3,4,5-tetrahydro-2-methyl-5-[2-(6-methyl-3-pyridyl)ethyl]-2H-pyrido[4,3-b]indole dihydrochloride Parenteral formulation Each 1 cc. ampul contains:

| | Per cc. |
|---|---|
| 8-chloro-1,3,4,5-tetrahydro - 2 - methyl-5-[2-(6-methyl - 3 - pyridyl)ethyl]2H-pyrido[4,3 - b]indole Dihydrochloride | mg 5.1 (2% excess) |
| Methyl Paraben U.S.P. | mg 1.8 |
| Propyl Paraben U.S.P. | mg 0.2 |
| Water for Injection U.S.P. q.s. ad | cc 1 |

Procedure (for 10,000 cc.):

1. In a clean glass or glass-lined vessel, 8,000 cc. of Water for Injection were heated to 90° C. It was then cooled to 50–60° C. and 18 gms. of methyl paraben and 2 gms. of propyl paraben were added and dissolved with stirring. The solution was then allowed to cool to room temperature.
2. The 51.0 gms. of 8-chloro-1,3,4,5-tetrahydro-2-methyl-5-[2-(6-methyl - 3-pyridyl)ethyl]-2H-pyrido-[4,3-b]indole dihydrochloride were added under an atmosphere of nitrogen and stirred until completely dissolved.
3. Sufficient Water for Injection was then added to make a total volume of 10,000 cc.
4. This solution was then filtered through an 02 Selas candle, filled into suitable size ampuls, gassed with nitrogen and sealed. It was autoclaved at 10 lbs. p.s.i. for 30 minutes.

Tablet formulation

| | Per tablet, mg. |
|---|---|
| 8-chloro-1,3,4,5-tetrahydro - 2 - methyl-5-[2-(6-methyl-3-pyridyl)ethyl] - 2H - pyrido[4,3-b]indole dihydrochloride | 10.0 |
| Lactose | 129.0 |
| Corn starch | 50.0 |
| Pregelatinized corn starch | 8.0 |
| Calcium stearate | 3.0 |
| Total weight | 200.0 |

Procedure:

1. 8-chloro-1,3,4,5 - tetrahydro - 2 - methyl-5-[2-(6-methyl - 3 - pyridyl)ethyl]-2H-pyrido[4,3-b]indole dihydrochloride, lactose, corn starch and pregelatinized corn starch were mixed in a suitable mixer.
2. The mix was passed through a Fitzpatrick Comminuting Machine fitted with No. 1A screen and with knives forward.
3. The mixture was returned to the mixer and moistened with water to a thick paste. The moist mass was passed through a No. 12 screen, and the moist granules were dried on paper lined trays at 110° F.
4. The dried granules were returned to the mixer, and the calcium stearate was added and mixed well.
5. The granules were compressed at a tablet weight of 200 mg. using standard concave punches having a diameter of 5/16".

Capsule formulation

| | Per capsule, mg. |
|---|---|
| 8-chloro-1,3,4,5-tetrahydro - 2 - methyl-5-[2-(6-methyl-3-pyridyl)ethyl]- 2H - pyrido[4,3-b]indole dihydrochloride | 25.5 |
| Lactose | 159.5 |
| Corn starch | 30.0 |
| Talc | 5.0 |
| Total net weight | 220.0 |

Procedure:

1. 8-chloro-1,3,4,5 - tetrahydro - 2 - methyl-5-[2-(6-methyl - 3 - pyridyl)ethyl]-2H-pyrido[4,3-b]indole dihydrochloride, lactose and corn starch were mixed in a suitable mixer.
2. The mixture was passed through a Fitzpatrick Comminuting Machine using a No. 1A screen and knives forward.
3. The mixture was returned to the mixer and the talc added. It was blended well and filled into No. 4 two-piece, hard gelatin capsules on a Parke-Davis capsulating machine. (Any similar type capsulating machine may be used.)

Suppository formulation

| | Per 1.3 gm. suppository, gm. |
|---|---|
| 8-chloro-1,3,4,5 - tetrahydro - 2 - methyl-5-[2-(6-methyl - 3 - pyridyl)ethyl]-2H-pyrido[4,3-b]indole dihydrochloride | 0.025 |
| Wecobee M (produced by E. F. Drew Company, 522 Fifth Avenue, New York 10, New York) | 1.230 |
| Carnauba wax | 0.045 |

Procedure:

1. The Wecobee M and the carnauba wax were melted in a suitable size glass lined container, mixed well and cooled to 45° C.
2. 8-chloro-1,3,4,5 - tetrahydro - 2 - methyl-5-[2-(6-methyl - 3 - pyridyl)ethyl]-2H-pyrido[4,3-b]indole dihydrochloride, which had been reduced to a fine powder with no lumps, was stirred until completely and uniformly dispersed.
3. The mixture was poured into suppository molds to yield suppositories having an individual weight of 1.3 gms.
4. The suppositories were cooled and removed from molds. They were then individually wrapped in wax paper for packaging.

We claim:

1. A compound of the formula

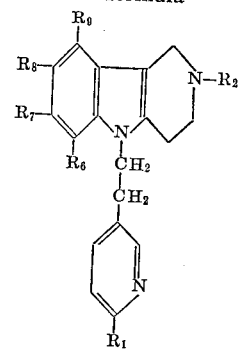

wherein $R_1$ is hydrogen or lower alkyl; $R_2$ is hydrogen, lower alkyl or phenyl-lower alkyl; and $R_6$, $R_7$, $R_8$ and $R_9$ are each independently hydrogen, bromo, chloro, methyl or trifluoromethyl such that at least one of $R_6$, $R_7$, $R_8$ or $R_9$ is other than hydrogen, and when $R_2$ is lower alkyl, $R_8$ is hydrogen, chloro, bromo or trifluoromethyl and a pharmaceutically acceptable acid addition salt thereof.

2. The compound according to claim 1 wherein $R_1$, $R_2$ and $R_7$ are each methyl; and $R_6$, $R_8$ and $R_9$ are each hydrogen, i.e., the compound 1,3,4,5-tetrahydro-2,7-dimethyl - 5-[2-(6-methyl-3-pyridyl)ethyl]-2H-pyrido[4,3-b]indole.

3. The compound according to claim 1 wherein each of $R_1$, $R_2$, $R_8$ and $R_9$ is methyl; and $R_6$ and $R_7$ are each hydrogen, i.e., the compound 1,3,4,5-tetrahydro-2,8,9-trimethyl - 5 - [2-(6-methyl-3-pyridyl)ethyl]-2H-pyrido[4,3-b]indole.

4. The compound according to claim 1 wherein each of $R_1$ and $R_2$ is methyl; $R_7$ is trifluoromethyl; and $R_6$, $R_8$ and $R_9$ are each hydrogen, i.e., the compound 7-trifluoromethyl-1,3,4,5-tetrahydro - 2 - methyl-5-[2-(6-methyl-3-pyridyl)ethyl]-2H-pyrido[4,3-b]indole.

5. The compound according to claim 1 wherein each of $R_1$ and $R_2$ is methyl; $R_8$ is trifluoromethyl; and each of $R_6$, $R_7$ and $R_9$ is hydrogen, i.e., the compound 8-trifluoromethyl-1,3,4,5-tetrahydro-2-methyl-5 - [2-(6-methyl-3-pyridyl)ethyl]-2H-pyrido[4,3-b]indole.

6. The compound according to claim 1 wherein $R_1$ and $R_2$ are each methyl; $R_6$, $R_8$ and $R_9$ are each hydrogen; and $R_7$ is chloro, i.e., the compound 7-chloro-1,3,4,5-tetrahydro-2-methyl-5-[2 - (6-methyl-3-pyridyl)ethyl]-2H-pyrido[4,3-b]indole.

7. The compound according to claim 1 wherein $R_1$ and $R_8$ are each methyl; and $R_2$, $R_6$, $R_7$ and $R_9$ are each hydrogen, i.e., the compound 1,3,4,5-tetrahydro-8-methyl-5-[2-(6-methyl-3-pyridyl)ethyl]-2H-pyrido[4,3-b]indole.

8. A compound of the formula

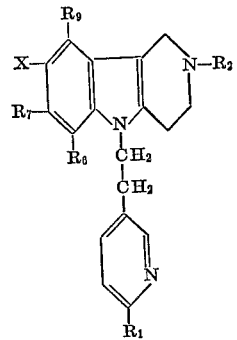

wherein X is bromo or chloro; $R_1$ is hydrogen or lower alkyl; $R_2$ is hydrogen, lower alkyl or phenyl-lower alkyl; and $R_6$, $R_7$ and $R_9$ are each independently hydrogen, bromo, chloro, methyl or trifluoromethyl and a pharmaceutically acceptable acid addition salt thereof.

9. The compound according to claim 8 wherein each of $R_1$, $R_2$ and $R_6$ is methyl; $R_8$ is chloro; and $R_7$ and $R_9$ are each hydrogen, i.e., the compound 8-chloro-1,3,4,5-tetrahydro-2,6-dimethyl-5-[2 - (6-methyl-3-pyridyl)ethyl]-2H-pyrido[4,3-b]indole.

10. A compound according to claim 8 wherein each of $R_6$, $R_7$ and $R_9$ is hydrogen, i.e., a compound of the formula

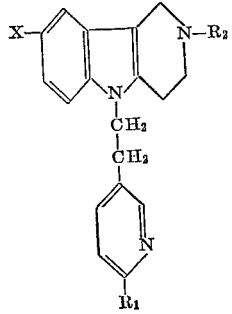

wherein X is bromine or chlorine; $R_1$ is hydrogen or lower alkyl; and $R_2$ is hydrogen, lower alkyl or phenyl-lower alkyl and a pharmaceutically acceptable acid addition salt thereof.

11. The compound according to claim 10 wherein $R_1$ and $R_2$ are each methyl; and X is chloro, i.e., the compound 8 - chloro - 1,3,4,5 - tetrahydro - 2 - methyl - 5-[2 - (6 - methyl - 3 - pyridyl)ethyl] - 2H - pyrido[4,3-b] indole and pharmaceutically acceptable acid addition salts thereof.

12. The base according to claim 11, i.e., the compound 8 - chloro - 1,3,4,5 - tetrahydro - 2 - methyl - 5 - [2 - (6-methyl - 3 - pyridyl)ethyl] - 2H - pyrido[4,3-b]indole.

13. The hydrochloride salt according to claim 12, i.e., the compound 8 - chloro - 1,3,4,5 - tetrahydro - 2 - methyl - 5 - [2 - (6 - methyl - 3 - pyridyl)ethyl] - 2H - pyrido[4,3-b]indole dihydrochloride.

14. The compound according to claim 10 wherein $R_1$ is hydrogen; $R_2$ is methyl; and X is chloro, i.e., the compound 8 - chloro - 1,3,4,5 - tetrahydro - 2 - methyl - 5-[2 - (3 - pyridyl)ethyl] - 2H - pyrido[4,3-b]indole.

15. The compound according to claim 10 wherein $R_1$ is methyl; $R_2$ is benzyl; and X is chloro, i.e., the compound 2 - benzyl -8 - chloro - 1,3,4,5 - tetrahydro - 5-[2 - (6 - methyl - 3 - pyridyl)ethyl] - 2H - pyrido[4,3-b]indole.

16. A compound according to claim 1 wherein $R_7$ and $R_8$ are each independently bromo, chloro, methyl or trifluoromethyl, i.e., a compound of the formula

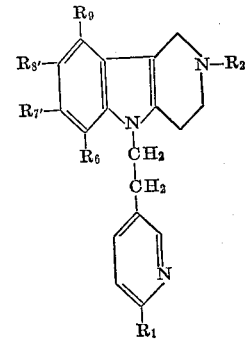

wherein $R_1$ is hydrogen or lower alkyl; $R_2$ is hydrogen, lower alkyl or phenyl-lower alkyl; $R_6$ and $R_9$ are each independently hydrogen, bromo, chloro, methyl or trifluoromethyl; and each of $R_8'$ and $R_7'$ is bromine, chlorine, methyl or trifluoromethyl and a pharmaceutically acceptable acid addition salt thereof.

17. The compound according to claim 16 wherein $R_1$ and $R_2$ are each methyl; $R_6$ and $R_9$ are each hydrogen; and $R_7'$ and $R_8'$ are each methyl, i.e., the compound 1,3,4,5 - tetrahydro - 2,7,8 - trimethyl - 5 - [2 - (6 - methyl-3-pyridyl)ethyl]-2H-pyrido[4,3-b]indole.

18. The compound according to claim 16 wherein $R_1$ and $R_2$ are each methyl; $R_6$ and $R_9$ are each hydrogen; and $R_7'$ and $R_8'$ are each chloro, i.e., the compound 7,8-dichloro - 1,3,4,5 - tetrahydro - 2 - methyl - 5 - [2 - (6-methyl - 3 - pyridyl)ethyl] - 2H - pyrido[4,3-b]indole.

19. The compound according to claim 16 wherein $R_1$, $R_2$ and $R_7'$ are each methyl; $R_6$ and $R_9$ are each hydrogen; and $R_8'$ is chloro, i.e., the compound 8-chloro-1,3,4,5 - tetrahydro - 2,7 - dimethyl - 5 - [2 - (6 - methyl - 3-pyridyl)ethyl]-2H-pyrido[4,3-b]indole.

20. The compound according to claim 16 wherein each of $R_1$, $R_2$ and $R_8'$ is methyl; $R_6$ and $R_9$ are each hydrogen; and $R_7'$ is chloro, i.e., the compound 7-chloro-1,3,4, 5 - tetrahydro - 2,8 - dimethyl - 5 - [2 - (6 - methyl - 3-pyridyl)ethyl]-2H-pyrido[4,3-b]indole.

References Cited

UNITED STATES PATENTS 2,786,059  3/1957  Horlein _____ 260—296

OTHER REFERENCES

Kost et al., Chemical Abstracts, vol. 58, Par. 7917–18, (1963).

HENRY R. JILES, *Primary Examiner.*

A. L. ROTMAN, *Assistant Examiner.*

UNITED STATES PATENT OFFICE
CERTIFICATE OF CORRECTION

Patent No. 3,409,628                  November 5, 1968

Leo Berger et al.

It is certified that error appears in the above identified patent and that said Letters Patent are hereby corrected as shown below:

Column 15, line 35, "5-[2-nitroso-" should read -- 5-[2-(N-nitroso- --. Column 20, line 27, "6T" should read -- 6N --.

Signed and sealed this 10th day of March 1970.

(SEAL)
Attest:

Edward M. Fletcher, Jr.            WILLIAM E. SCHUYLER, JR.
Attesting Officer                    Commissioner of Patents